United States Patent [19]
Aswell et al.

[11] Patent Number: 6,097,021
[45] Date of Patent: *Aug. 1, 2000

[54] APPARATUS AND METHOD FOR A MANAGED INTEGRATION OPTICAL SENSOR ARRAY

[75] Inventors: Cecil J. Aswell, Orangevale, Calif.; John H. Berlien, Jr., Plano; Eugene G. Dierschke, Dallas, both of Tex.

[73] Assignee: Texas Instruments Incorporated, Dallas, Tex.

[*] Notice: This patent is subject to a terminal disclaimer.

[21] Appl. No.: 09/002,731

[22] Filed: Jan. 5, 1998

Related U.S. Application Data

[60] Provisional application No. 60/034,532, Jan. 6, 1997.

[51] Int. Cl.[7] .............................. H04N 1/40; H01L 27/00
[52] U.S. Cl. .................................. 250/208.1; 250/214 A; 358/406; 358/448
[58] Field of Search ........................... 250/208.1, 214 A, 250/214 R; 358/406, 448, 482; 348/222

[56] References Cited

U.S. PATENT DOCUMENTS 5,448,056  9/1995  Tsuruta ................................ 250/214 A

OTHER PUBLICATIONS

Optoelectronics, "400 DPI Linear Image Sensor with Electronic Shutter Capability", Oct. 1996.

"TSL 1401 128×1 Linear Sensor Array with Hold", Texas Instruments Incorporated, SOES029, Jun. 1996.

*Primary Examiner*—Seungsook Ham
*Assistant Examiner*—Kevin Pyo
*Attorney, Agent, or Firm*—Wade James Brady, III; Frederick J. Telecky, Jr.

[57] ABSTRACT

Managed integration optical sensor array (11) having an array block (12). The array block having a plurality of optical sensors (13), a switch control logic circuit (59) and a bit shift register (60). The switch control logic circuit (59) operating to control the integration periods of each optical sensor (13).

16 Claims, 3 Drawing Sheets

APPARATUS AND METHOD FOR A MANAGED INTEGRATION OPTICAL SENSOR ARRAY

Third application claims priority under 35 USC § 119 (e)(1) of provisional application number 60/034,532 filed Jan. 6, 1997.

CROSS-REFERENCE TO RELATED PATENTS APPLICATIONS

This patent is related to the following co-pending patent applications: Ser. No. 09/022,639 filed Jan. 5,1998, now U.S. Pat. No. 6,025,589, entitled Apparatus and Method for Active Integrator Optical Sensors, Attorney's Docket TI-23303; and Ser. No. 09/002,639 filed Jan. 5, 1998, now U.S. Pat. No. 6,025,589, entitled Apparatus and Method for Normalizing Multiple Color Signals, Attorney's Docket TI-24772. Each of the above entitled co-pending applications is assigned to Texas Instruments Incorporated.

TECHNICAL FIELD OF THE INVENTION

This invention relates generally to optical sensor arrays, and more particularly to a managed integration optical sensor array.

BACKGROUND OF THE INVENTION

Optical sensors are used in a number of applications ranging from scanning a bar code on a package or digitizing a document for display or printing to optical communications systems. Optical sensors generally operate by detecting electromagnetic energy and producing an electrical signal that corresponds to the intensity of the electromagnetic energy striking the optical sensor. Multiple optical sensors are generally used and are often geometrically positioned in arrays with individual optical sensors corresponding to a respective pixel in a resulting electronic display (the term pixel and optical sensor as used in the art and as used in this application are interchangeable). Such arrays allow a larger spatial area to be scanned than could otherwise be performed by a single optical sensor. Other applications may use a raster scan technique in which fewer optical sensors are needed but a document is scanned in an incremental pattern until the document is completely scanned.

An electrical signal from each optical sensor is typically conditioned by an output modifier. The output modifier conditions the electrical signal or converts the electrical signal into an output signal that can be easily understood by a computer processor. The function of the output modifier may be performed by a charge to voltage amplifier or an analog to digital (A/D) converter.

The output signal from the output modifier, corresponding to a respective optical sensor, is next processed in a manner consistent with the specific application. In one application, a computer processor may function as a signal processor that assembles the various output signals and displays or prints the resulting picture. In another application, the computer processor could use the output signal to stop a conveyor belt when groceries have been moved up to the check-out register. The applications in which optical sensors can be used is without bound.

Optical sensors may be manufactured in many semiconductor technologies including MOS (Metal Oxide Semiconductors), CMOS (Complementary MOS), I2L, J-FET, or Bi-CMOS. Each of the manufacturing technologies have trade offs with respect to performance, manufacturing cost, and required associated supplies and interface circuits. Optical sensors have previously been manufactured based on CCD (Charge Coupled Device) technology. Generally CCD's require a dedicated process technology, require multiple supplies, require more complicated interface electronics, and have limited capability for integrating other electronic functions.

Optical sensors generally comprise a photodetector and an electrical circuit. The photodetector produces an electrical signal in proportion to the electromagnetic energy striking the photodetector. The electrical circuit stores an electrical signal produced by the photodetector as an integrated result voltage. An electrical circuit is generally based on either a passive integrator architecture or an active integrator architecture. The passive integrator architecture often comprises a photodiode and a capacitance that includes the capacitance of the photodiode junction, the buffering circuitry, and other parasitic capacitances. The active integrator architecture generally comprises an operational amplifier and an integrating capacitor coupled to a photodiode (See copending U.S. patent application Ser. No. 09/002,904 filed Jan. 5, 1998, now U.S. Pat. No. 6,031,217, entitled Apparatus and Method for Active Integrator Optical Sensors, Attorney Docket No. TI-23303).

An optical sensor generally requires a finite amount of time in which to produce a usable electrical signal in response to electromagnetic energy striking the photodetector. This time period is the integration period and can vary from as little as a few nanoseconds to minutes in duration. At the conclusion of the integration period, the integrated result voltage from the electrical circuit is transferred to the output modifier for further processing. The optical sensor is then reset to zero and a new integration period can begin. The actual time duration of the integration period and the resetting period are generally the same for each optical sensor in the array.

An optical sensor array often comprises multiple photodetectors and an electrical circuit corresponding to each individual photodetector. The optical sensor array may also include a timing circuit that provides a timing sequencing for internal and external operation of the optical sensor array. In addition, the optical sensor array may incorporate an output modifier that conditions the electrical signal into a usable form for a signal processor such as a general purpose computer processor.

Optical sensor arrays generally operate by transferring the electrical signal from each individual optical sensor in the array in sequence to the computer processor through an output modifier. The result is that each optical sensor has a different time frame over which it is integrating and resetting. In applications where the document to be scanned is stationary, the different integration and reset periods would not generally affect the result. However, in applications where the document to be scanned is in motion and a "snapshot" of the document is needed, the different time frames affect the result.

When a document is in motion and passes over the optical array, each optical sensor is at a different point in its integration and reset cycle. At the extremes, one optical sensor will just begin its integration cycle as the document passes in front of the optical sensor. At the other extreme is the optical sensor that has just completed its respective integration cycle as the document passes in front of the optical sensor. The problem is that each optical sensor will thereby integrate an electrical signal that corresponds to a different area of the document. A display of the image from the optical array would show a document that is slanted or "skewed" as a result of the different integration time frames.

The prior art has attenuated the skewing effect by either slowing down the relative motion of the document to the optical array or by speeding up the speed of the optical array. Thus, the speed by which the object is moving past the array is dependent upon the integration speed of the optical sensor.

An optical sensor array based on CCD technology operates fast enough to be used in many applications. A problem with CCDs is that CCDs require special processing, multiple clocks and multiple supplies and are therefore expensive to manufacture.

An optical sensor array manufactured using CMOS technology is generally less expensive. However, a CMOS optical sensor using a passive integration architecture does not generally operate at a sufficient speed to avoid skewing of the document. A CMOS optical sensor using active integrator architecture may operate fast enough to be used in many applications, however, the skewing effect is not completely avoided.

SUMMARY OF THE INVENTION

Accordingly, a need has arisen in the art for an improved optical sensor array. The present invention provides an optical sensor array in which the start and stop time of the integration period for each optical sensor in an optical sensor array can be controlled or managed. The present invention addresses shortcomings of prior optical sensor arrays.

In accordance with the teachings of the present invention, a managed integration optical sensor array may include a control logic circuit to control the integration period of each optical sensor within the optical sensor array. Each optical sensor within the optical sensor array incorporating the teachings of the present invention will preferably have a photodetector with an associated electrical circuit for accumulating and storing the electrical signal from the photodetector as an integrated result voltage. A bit shift register may be used in a managed integration optical sensor array as an address pointer that controls which optical sensor is to be sampled. Other techniques known in the art for addressing the optical sensor to be sampled may be used to manufacture a managed integration optical sensor array in accordance with the teachings of the present invention.

The optical sensors comprising the optical sensor array generally operate in a cycle. The cycle can be generally broken down into three time periods, the integration period, the transfer period, and the reset period. The integration period of the cycle occurs when the electrical circuit accumulates and stores an integrated result voltage that is proportional to the electrical signal received from the photodetector. The transfer period occurs when the integrated result voltage is transferred from the electrical circuit. In some applications, the integrated result voltage is transferred to the output modifier which conditions the signal for the signal processor. In other applications, the integrated result voltage from each optical sensor is transferred to a store capacitor, which is then accessed and transferred to the output modifier and the signal processor. The reset period occurs when the electrical circuit is reset to zero or some reference voltage. The electrical circuit is then ready to begin the integration period again and accumulate and store an electrical signal from the photodetector. Each of the periods noted operate during a finite amount of time. Depending upon the configuration of the optical array, the cycle time will vary. The noted cycle explanation may not include all cycle periods for each application. The cycle periods and durations are dependent upon the architecture of the optical sensors used. The above description shall in no way limit this application to an optical sensor that only includes the above noted three time periods.

In a preferred embodiment, the optical sensor array includes a logic control circuit and a bit shift register in addition to the plurality of optical sensors making up the optical sensor array. The logic control circuit controls the integration period of each optical sensor within the optical sensor array. The present invention teaches that the integration period or start and stop time for each optical sensor within the optical sensor array may be controlled by the logic control circuit. Thus, for some applications, the integration periods of all optical sensors may occur concurrently. In other applications, the integration period for the optical sensors in the optical sensor array may be set to different integration periods.

Other applications may require a combination of concurrent and different integration periods.

The electrical signal that is produced by the integrator may be transferred to a corresponding store capacitor. After the transfer, the optical sensor can immediately be reset and the integration period of the cycle started anew. The electrical signal stored on each of the store capacitors can then be transferred to an output modifier serially or in parallel. The bit shift register may then control which store capacitor is accessed by the output modifier.

A preferred embodiment of the present invention may include using an active integrator architecture as shown in copending U.S. patent application Ser. No. 09/002,904 filed Jan. 5, 1998, now U.S. Pat. No. 6,031,217, entitled Apparatus and Method for Active Integrator Optical Sensors, Attorney Docket No. TI-23303. In this embodiment, the store capacitor is connected to the output of the electrical circuit through an analog switch and used as a sample-hold. All store capacitors may be switched to the hold mode at the same time, and all integrators are reset concurrently.

For some applications, embodiments of the present invention may be preferably manufactured using CMOS technology. This allows the optical sensor to be manufactured in a technology that is much cheaper than the prior art which needed the performance characteristics of CCD technology to function. However, other technologies may be used to manufacture an optical sensor using an active integrator architecture in accordance with teachings of the present invention.

A technical advantage of the present invention is that the integration periods for the optical sensors can be specifically controlled. This includes setting the integration periods for each optical sensor in the optical sensor array to integrate concurrently. This will have the effect of allowing a snapshot of an object or document that is in motion.

A further technical advantage of the present invention is that the integrated result voltage from the optical sensor may be accessed in serial fashion for conversion to a serial analog output independent of the optical sensor integration period sampling and reset actions, thereby increasing the processing speed of the optical sensor array. However, the integrated result voltage signal from the optical sensor may be accessed in a parallel fashion as needed for the application.

An additional technical advantage is that the present invention provides a low cost optical sensor array. Specifically, an optical sensor array manufactured using CMOS technology.

The present invention has the additional advantage of allowing the electrical signal stored on the electrical circuit or on the store capacitors to be transferred in serial or in parallel to the computer processor.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiments of the present invention and its advantages are best understood by referring in more detail to FIGS. 1–5 of the drawings, in which like names refer to like parts throughout the several views.

For purposes of this application the term "photodetector" includes any detector that responds to radiant or electromagnetic energy. Examples of such detectors include but are not limited to photoconductive cells, photodiodes, photoresistors, photoswitches and phototransistors.

Figure 1:
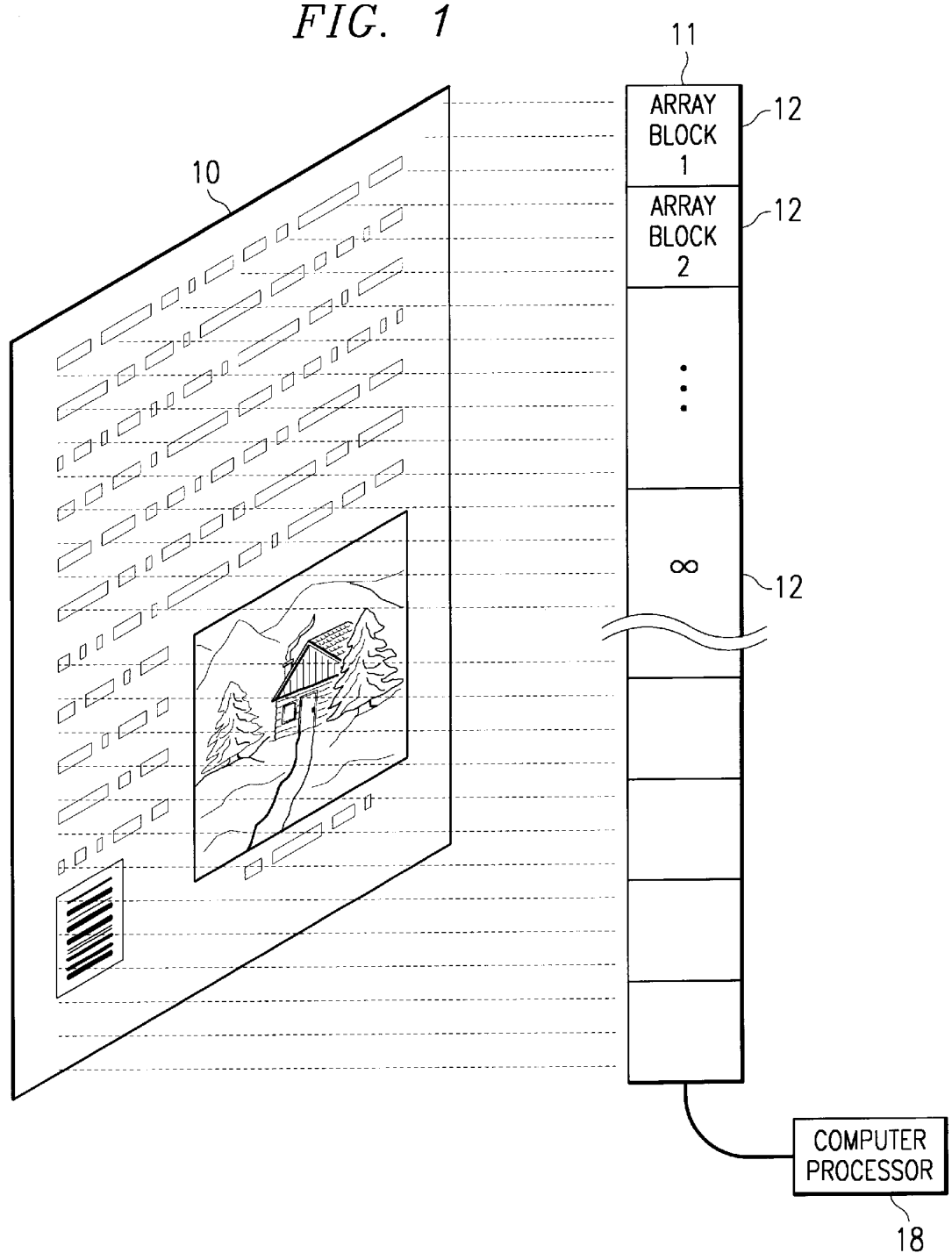
FIG. 1 is a schematic block diagram showing a document being scanned by a linear optical sensor array. The linear optical array is comprised of individual array blocks which are comprised of individual pixels or optical sensors.

FIG. 1 is a schematic block diagram of optical sensor array 11 constructed in accordance with teachings of the present invention. During a typical scanning operation, optical sensor array 11 will detect electromagnetic energy reflected from or passing through document 10. Each optical sensor 13 (FIG. 2) in optical sensor array 11 stores an integrated result voltage corresponding to such electromagnetic energy from document 10. The integrated result voltage corresponding to each optical sensor 13 is transferred as an output signal to output modifier 17. Computer processor 18 may assemble the output signals into an electronic map or picture of document 10 for display, transmission or further processing.

Scanning document 10 can be accomplished by several methods. The most common scanning method is for document 10 to be scanned in increments or slices by an optical sensor array 11 that is of sufficient length that the entire length of document 10 is scanned in incremental slices. Another scanning method often referred to as rastering, scans document 10 incrementally both vertically and horizontally in a selected pattern until document 10 has been fully covered. Rastering often requires a smaller number of individual optical sensors.

Optical sensor array 11, as shown, is configured as a linear optical array. Optical sensor array 11 may, however, be configured in other geometric configurations, such as a general rectangular array (not shown) having multiple columns and rows of array blocks 12, or even a star geometric pattern (not shown) of array blocks 12.

Optical sensor array 11 is comprised of one or more array blocks 12. Electromagnetic energy passes through or is reflected by document 10. The electromagnetic energy striking optical sensors 13 (FIG. 2) correspond to specific locations on document 10 to be scanned. Each optical sensor 13 of optical sensor array 11 produces an output signal that corresponds to the intensity of the electromagnetic energy striking the optical sensor 13. After obtaining an output signal from each optical sensor 13 in optical sensor array 11, document 10 or optical sensor array 13 is incrementally shifted to allow a different slice or segment of document 10 to be scanned. The electrical signal from each optical sensor 13 is conditioned by output modifier 17 (FIG. 3) in a manner consistent with the requirements of computer processor 18. A wide variety of signal processors may be satisfactorily used with electronic sensor array 11 in addition to computer processor 18. Output modifier 17 is generally a charge to voltage amplifier. However, output modifier 17 could also be an analog to digital (A/D) convertor. Computer processor 18 assembles each slice or segment to form an electronic map or picture of document 10.

The source of electromagnetic energy (not shown) may be any source of electromagnetic energy, including natural light and artificial light of many kinds such as coherent light from a laser.

Figure 2:
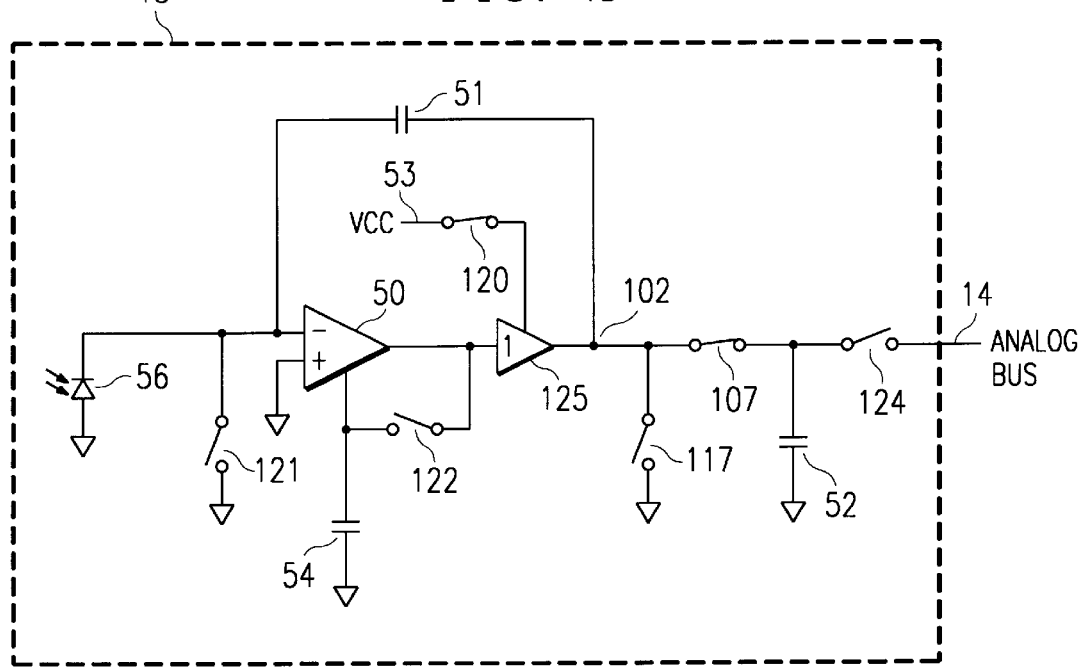
FIG. 2 is a schematic diagram of an optical sensor having an active integrator architecture.

FIG. 2 shows an optical sensor constructed in accordance with an active integrator architecture such as shown in copending U.S. patent application Ser. No. 09/002,904 filed now U.S. Pat. No. 6,031,217, entitled Apparatus and Method for Active Integrator Optical Sensors, Attorney Docket No. TI-23303. An optical sensor using an active integrator architecture is the preferred embodiment of the present invention. The active integrator optical sensor, as drawn, shows active integrator optical sensor 13 in the integrate and store period or portion of the associated operating cycle. For purposes of explanation, it is assumed that an offset correction and hold period has previously taken place and an offset correction voltage is stored on offset capacitor 54. Output buffer 125 is active (switch 120 closed) and the voltage on store capacitor 52 is the same as the output at node 102 of the integrator (switch 107 closed).

The next time period or portion of the operating cycle is the offset correction and hold period. The preferred embodiment of the present invention uses capacitor offset correction and is described in further detail below.

To get to the offset correction and hold state from the integrate and store state, switch 107 is first opened so that the output at node 102 of the active integrator is stored on capacitor 52 and then switches 121, 117 and 122 are closed and switch 120 opened. The delay between opening switch 107 and actuating the other switches is in the order of a few nano-seconds and may be satisfactorily accomplished using conventional non-overlapping clock techniques.

Opening switch 120 disables output buffer 125. Closing switch 122 connects the output of op amp 50 to the offset cancellation feedback node. Closing switch 121 shorts the inverting input gate of op amp 50 and one end of integrating capacitor 51 to ground. Closing switch 117 shorts the other end of integrating capacitor 51 (node 102) to ground, thereby resetting the active integrator electrical circuit.

With both the inverting input and non-inverting input of op amp 50 at ground potential, the output of op amp 50 will drive the offset correction node (top of offset capacitor 54) such that the load currents for the input differential pair of op amp 50 exactly match the currents through the differential pair. The effects of current mismatches due to random or systematic offsets are compensated for in this manner. Switch 122 is then opened, storing the offset correction voltage on offset capacitor 54. Switches 121 and 117 are then opened and switch 120 closed, activating the main integrator loop. The voltage at node 102 of the integrator is proportional to the photocurrent integrated since the end of the offset correction cycle, while the voltage on store capacitor 52 is representative of the previous integration period output. The voltage result of the previous integration cycle represented by the charge stored on store capacitor 52 is dumped onto analog bus 14 by closing switch 124.

After both the offset correction and hold period and the charge dump of store capacitor 52 has been completed the electrical circuit returns to the integrate and store state. The output voltage charge on store capacitor 52 may also have been dumped on analog bus 14 during the offset correction and hold period.

Although this embodiment is described in terms of having the non-inverting input of op amp 50 connected to ground and the various switches shorting everything to ground, a common DC reference voltage may be used.

Figure 3:
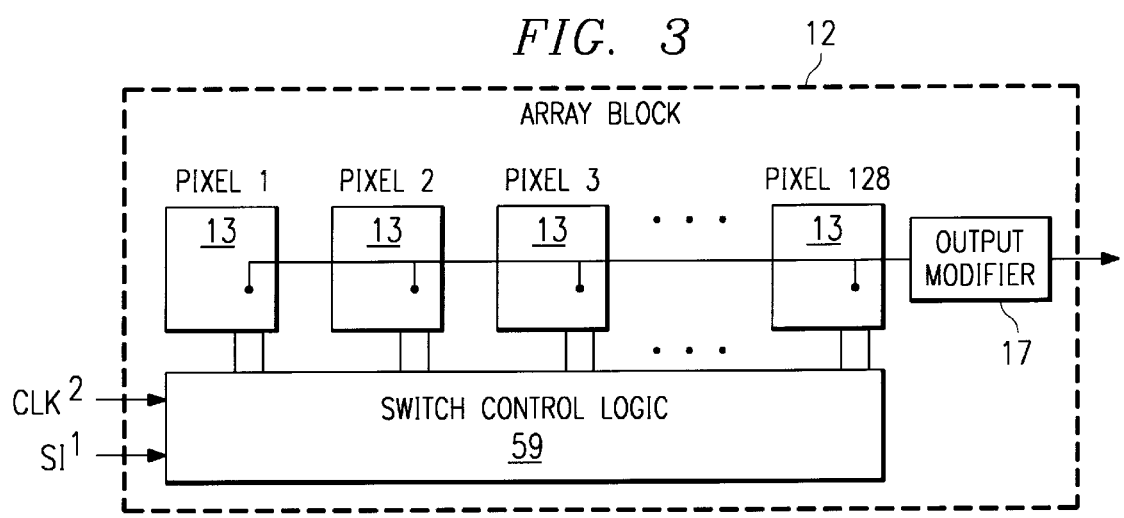
FIG. 3 is a schematic block diagram showing an array block containing the representative array blocks controlled by switch controlled logic, each optical sensor output being transferred to the output modifier.

FIG. 3 is a schematic block diagram showing one embodiment of the present invention. Array block 12 contains optical sensors 13 controlled by switch control logic 59 such that the output signal of each optical sensor 13 is conditioned by output modifier 17. Switch control logic 59 operates to control the internal and external timing of each array block 12. This may include controlling the individual integration periods for each optical sensor 13, queuing each optical sensor 13 for its respective output signal and resetting each optical sensor 13. As previously discussed, output modifier 17 will preferably condition the output signal from each optical sensor 13 as required by computer processor 18 (FIG. 1).

Figure 4:
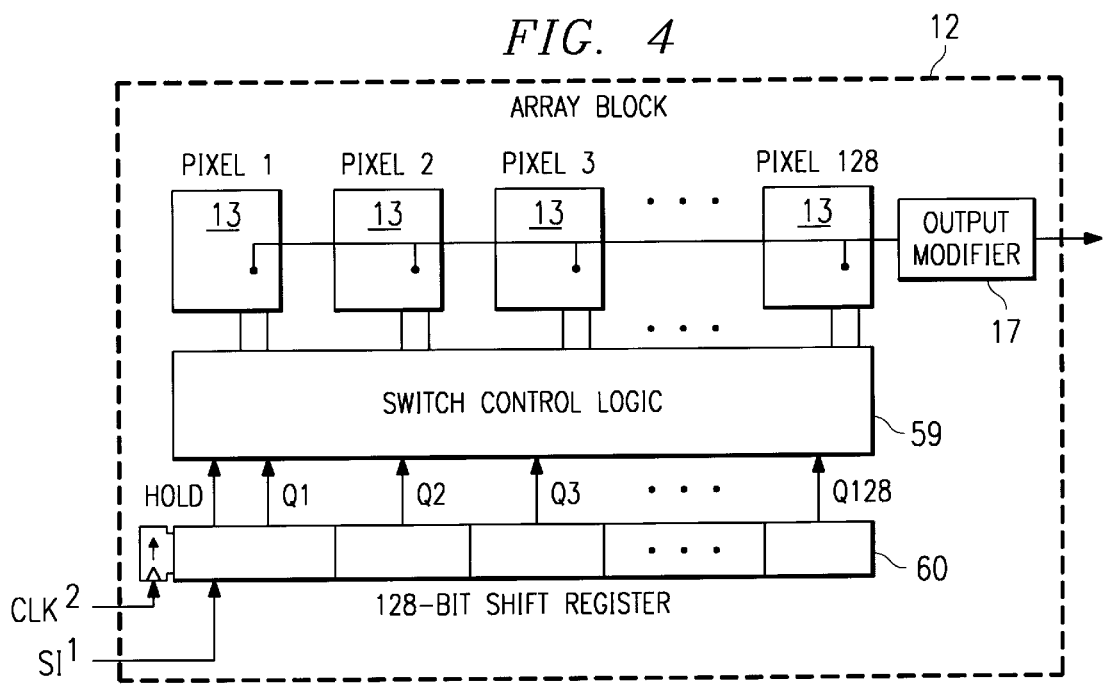
FIG. 4 is a schematic block diagram of the preferred embodiment of the present invention showing each array blocs having all optical sensors controlled by switched controlled logic and a 128-bit shift register being utilized to control which optical sensor is being sampled.

FIG. 4 is a schematic block diagram showing an alternative embodiment of the present invention. This figure shows the addition of bit shift register 60 within sensor array block 12. Bit shift register 60 is an address pointer that controls which optical sensor 13 is to be sampled. In one embodiment, bit shift register 60 would control which store capacitor 52 is to be sampled. This embodiment offers the advantage of allowing the integrator circuit to be reset and begin an integrate and store period without waiting for the output from optical sensor 13 to be transferred to computer processor 18 (FIG. 1).

As previously discussed, switch control logic 59 would control the internal and external timing of array block 12. The output (integrated result voltage) from each optical sensor array 11 may be transferred to computer processor 18 (FIG. 1) by multiple methods. In one embodiment, the output is transferred serially over a single output line to computer processor 18 (FIG. 1). In another embodiment, the output is transferred in parallel through multiple output lines to computer processor 18 (FIG. 1).

In another embodiment of the present invention, switch control logic 59 could control the start time and ending time of the integration period. The integration period for all optical sensors 13 in optical sensor array 11 (FIG. 1) may integrate simultaneously. In yet another embodiment, switch control logic 59 could vary when each optical sensor 13 is in the integration period, thereby providing an optical sensor 13 in its integration period at all times.

Figure 5:
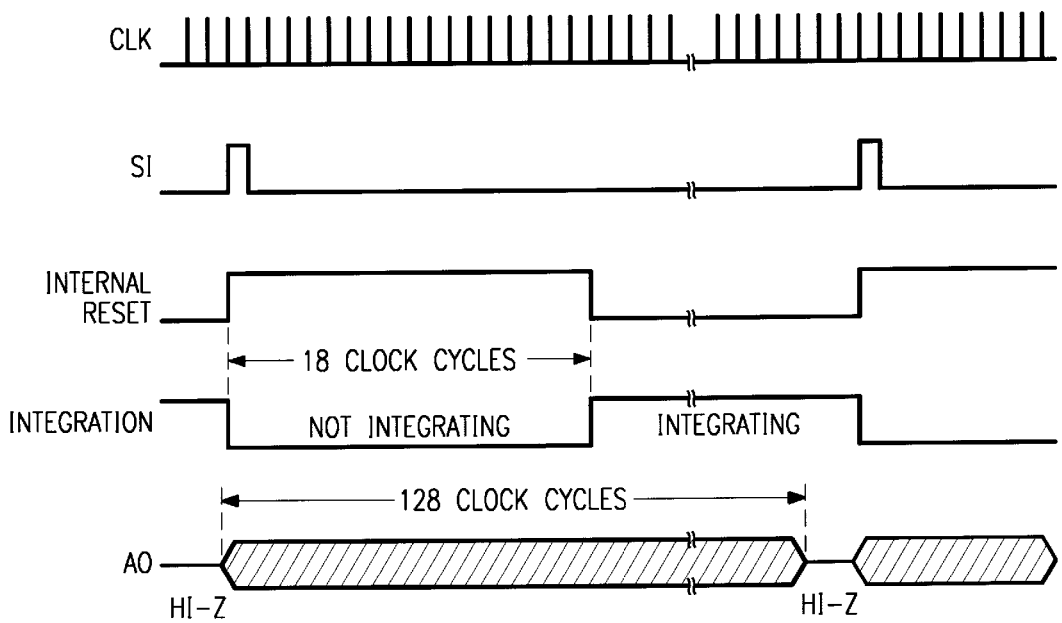
FIG. 5 is a timing diagram showing the external signals of an active integrator optical sensor that uses the preferred embodiment of the present invention shown in FIG. 4.

FIG. 5 is a timing diagram that shows the input clock signal "CLK" and the input start signal "SI" in addition to output signal "AO." The output signal "AO," as shown, is in accordance with the preferred embodiment of the present invention. The preferred embodiment of the present invention includes the use of an active integrator optical sensor 13 and bit shift register 60.

Although the present invention has been described with several embodiments, various changes and modifications may be suggested to one skilled in the art. It is intended that the present invention encompass such changes and modifications as fall within the scope of the following claims.

What is claimed is:

1. A managed integration optical sensor array for use in producing an output signal in response to electromagnetic radiation, comprising:

a plurality of optical sensors with each optical sensor having an integration period;

each optical sensor having a photodetector with an electrical signal output proportional to the intensity of the electromagnetic energy incident with the photodetector;

an electrical circuit coupled with each photodetector to integrate the electrical signal from each photodetector; and a switch control logic circuit coupled to the plurality of optical sensors operable to control the timing of the output signal and the integration period of each optical sensor, wherein the electrical circuit comprises:

an operational amplifier having an offset correction, at least one non-inverting input, at least one inverting input and at least one output;

a reference voltage supplied to the electrical circuit;

the photodetector coupled to the operational amplifier inverting input and to the reference voltage;

an integrating voltage storage device coupled to the operational amplifier inverting input and to the operational amplifier output for storing an accumulated electrical signal from the photodetector;

a store voltage storage device coupled to the operational amplifier output and to the reference voltage for storing a voltage proportional to the voltage stored on the integrating voltage storage device;

an output bus coupled to the store voltage storage device; and the operational amplifier non-inverting input coupled to the reference voltage.

2. The managed integration optical sensor array of claim 1, further comprising each optical sensor in the optical array operable to integrate the electrical signal output from the respective photodetectors during the same time period.

3. The managed integration optical sensor array of claim 1, further comprising a bit shift register coupled to the electrical circuit and the switch control logic circuit.

4. The managed integration optical sensor array of claim 1, wherein the photodetector comprises a photodiode.

5. The managed integration optical sensor array of claim 1, wherein the optical sensor array is manufactured using CMOS technology.

6. The managed integration optical sensor array of claim 1, wherein the electrical circuit comprises passive integration architecture.

7. The managed integration optical sensor array of claim 1, wherein the electrical circuit comprises active integrator architecture.

8. The managed integration optical sensor array of claim 1, further comprising each electrical circuit having a serially transferred output for downloading the output signal from the electrical circuit.

9. The managed integration optical sensor array of claim 1, further comprising each electrical circuit having a parallel transferred output for downloading the output signal from the electrical circuit.

10. A managed integration optical sensor array for use in producing an output signal in response to electromagnetic radiation, comprising:
   a plurality of optical sensors with each optical sensor having an integration period;
   each optical sensor having a photodiode with an electrical signal output generally proportional to the intensity of the electromagnetic energy incident with the photodiode;
   an electrical circuit coupled with each photodiode to accumulate and store the electrical signal output from the photodiode;
   a store capacitor coupled with each optical sensor the output signal from the electrical circuit;
   a bit shift register coupled to the electrical circuit to control the order of accessing each store capacitor; and
   a switch control logic circuit coupled to the plurality of optical sensors operable to control the timing of the integration period of each optical sensor and control the timing of the output signal from the respective store capacitor,
   wherein the electrical circuit comprises:
      an operational amplifier having an offset correction, at least one non-inverting input at least one inverting input and at least one output;
      a reference voltage supplied to the electrical circuit;
      the photodetector coupled to the operational amplifier inverting input and to the reference voltage;
      an interverting voltage storage device coupled to the operational amplifier inverting input and to the operational amplifier output for storing an accumulated electrical signal from the photodetector;
      a store voltage storage device coupled to the operational amplifier output and to the reference voltage for storing a voltage Proportional to the voltage stored on the integrating voltage storage device;
      an output bus coupled to the store voltage storage device; and
      the operational amplifier non-inverting input coupled to the reference voltage.

11. The managed integration optical sensor array of claim 10, further comprising each optical sensor in the optical array accumulating and storing the electrical signal output from each photodiode during the same time period.

12. The managed integration optical sensor array of claim 10, wherein the optical sensor is manufactured using CMOS technology.

13. The managed integration optical sensor array of claim 10, wherein the electrical circuit comprises passive integration architecture.

14. The managed integration optical sensor array of claim 10, wherein the electrical circuit comprises active integrator architecture.

15. The managed integration optical sensor array of claim 10, further comprising each store capacitor having a serially transferred output for downloading the output signal stored on each respective store capacitor.

16. The managed integration optical sensor array of claim 10, further comprising each store capacitor having a parallel transferred output for downloading the output signal stored on each respective store capacitor.

* * * * *